(12) United States Patent
Qi et al.

(10) Patent No.: US 10,989,934 B2
(45) Date of Patent: Apr. 27, 2021

(54) GLASSES AND METHOD FOR CONTROLLING THE SAME

(71) Applicant: BOE TECHNOLOGY GROUP CO., LTD., Beijing (CN)

(72) Inventors: Aixiang Qi, Beijing (CN); Yongxin Zhang, Beijing (CN); Shihao Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 190 days.

(21) Appl. No.: 16/257,437

(22) Filed: Jan. 25, 2019

(65) Prior Publication Data
US 2019/0293968 A1 Sep. 26, 2019

(30) Foreign Application Priority Data
Mar. 20, 2018 (CN) .......................... 201810233712.6

(51) Int. Cl.
*G02C 5/08* (2006.01)
*G02C 11/00* (2006.01)
*G02C 5/04* (2006.01)
*G02C 5/20* (2006.01)
*G02C 7/10* (2006.01)

(52) U.S. Cl.
CPC .............. *G02C 11/10* (2013.01); *G02C 5/045* (2013.01); *G02C 5/20* (2013.01); *G02C 7/10* (2013.01)

(58) Field of Classification Search
CPC . G02C 11/10; G02C 5/08; G02C 5/10; G02C 5/143; G02C 5/20
USPC ................ 351/63, 51, 52, 158; 2/454; 206/5
See application file for complete search history.

(56) References Cited

U.S. PATENT DOCUMENTS

| 2015/0177535 | A1* | 6/2015 | Porter | ....................... G02C 5/08 351/63 |
|---|---|---|---|---|
| 2016/0109722 | A1 | 4/2016 | McKegg | |

FOREIGN PATENT DOCUMENTS

| CN | 201126503 Y | 10/2008 |
|---|---|---|
| CN | 204241857 U | 4/2015 |
| CN | 105556378 A | 5/2016 |
| CN | 206671682 U | 11/2017 |

OTHER PUBLICATIONS

Chinese First Office Action issued in Chinese Patent Application No. 201810233712.6, dated Apr. 26, 2019; with English translation.

\* cited by examiner

*Primary Examiner* — Hung X Dang
(74) *Attorney, Agent, or Firm* — McDermott Will & Emery LLP

(57) ABSTRACT

A pair of glasses is provided. The glasses include a first lens, a second lens, a first temple arm that is disposed close to the first lens, and a second temple arm that is disposed close to the second lens. The glasses further include a position adjusting portion that is mounted on the first lens and the second lens. The position adjusting portion is configured to adjust an overlapping area of the first lens and the second lens. The glasses further include a first display screen on a first temple arm. The first temple arm and the second temple arm may be bent in extension directions of the temple arms, so that a tail end of the first temple arm overlaps a tail end of the second temple arm.

15 Claims, 6 Drawing Sheets

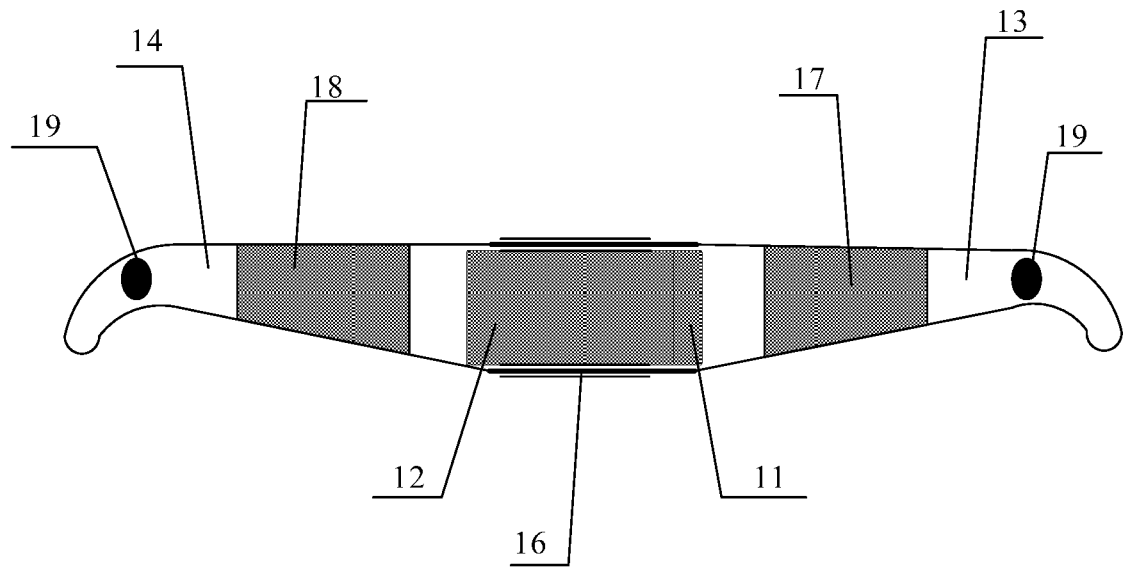

Fig. 9

```
┌─────────────────────────────────────────────┐
│ The distance sensor measures a distance     │
│ between the first temple arm and the        │──S101
│ second temple arm, and transmits the        │
│ measured distance to the controller unit    │
└─────────────────────────────────────────────┘
                      │
                      ▼
┌─────────────────────────────────────────────┐
│ The controller unit controls the first      │
│ display screen to be turned on when the     │──S102
│ measured distance is less than or equal     │
│ to a preset distance                        │
└─────────────────────────────────────────────┘
```

Fig. 10

GLASSES AND METHOD FOR CONTROLLING THE SAME

CROSS-REFERENCE TO RELATED APPLICATION

This application claims priority to Chinese Patent Application No. 201810233712.6, filed on Mar. 20, 2018, titled "A PAIR OF SUNGLASSES", which is incorporated herein by reference in its entirety.

TECHNICAL FIELD

The present application relates to the field of accessory manufacturing technologies, and in particular, to a pair of glasses and a method for controlling the same.

BACKGROUND

Glasses, e.g. sunglasses, also named sunshades, may be worn to shield strong light. When people are in the sun, they usually adjust the luminous flux by adjusting the pupil size. However, when the light is too strong and the light intensity is beyond the adjusting ability of human eyes, the light may cause damage to human eyes, producing eyestrain and other discomforts to the eyes. Therefore, people usually choose to wear a pair of sunglasses to change the intensity of light perceived by the eyes when they go out in strong light, so as to reduce the fatigue caused by eye accommodation or the damage caused by strong light.

SUMMARY

Some embodiments of the present disclosure provide a pair of glasses. The glasses include a first lens and a second lens, a first temple arm that is disposed close to the first lens, and a second temple arm that is disposed close to the second lens. The glasses further include a position adjusting portion that is mounted on the first lens and the second lens; the position adjusting portion is configured to adjust an overlapping area of the first lens and the second lens. The glasses further include a first display screen. The first temple arm and the second temple arm may be bent in extension directions of the temple arms, so that a tail end of the first temple arm overlaps a tail end of the second temple arm.

In some embodiments of the present disclosure, the position adjusting portion includes a fixed structure and a sliding structure. The fixed structure is mounted on the first lens; the sliding structure is mounted on the second lens. At least a part of the fixed structure is located in the sliding structure, and the fixed structure is configured to slide along the sliding structure so that the first lens at least partially overlaps the second lens.

In some embodiments of the present disclosure, the glasses further include a frame. The first lens and the second lens are disposed in the frame; the first temple arm and the second temple arm are both mounted on the frame. The frame includes a position adjusting portion.

In some embodiments of the present disclosure, the first display screen is disposed on the first temple arm.

In some embodiments of the present disclosure, the glasses are sunglasses.

In some embodiments of the present disclosure, the fixed structure is a fixed bar, and the fixed bar is mounted on an upper edge and/or a lower edge of the first lens; the sliding structure is a sliding rail, and the sliding rail is mounted on an outer side or an inner side of an upper edge and/or a lower edge of the second lens along an extension direction of the fixed bar. One end of the fixed bar that is close to the second lens is located in the sliding rail, and the fixed bar is configured to slide along the sliding rail, so that the first lens and the second lens overlap.

In some embodiments of the present disclosure, a locking structure is disposed between the fixed bar and the sliding rail; the locking structure is configured to define relative positions of the fixed bar and the sliding rail.

In some embodiments of the present disclosure, the glasses further include a controller unit and at least one distance sensor. The controller unit is disposed on the first temple arm; the distance sensor is disposed on a tail end of the first temple arm and/or a tail end of the second temple arm. The distance sensor is configured to measure a distance from the first temple arm to the second temple arm, and transmit the measured distance to the controller unit. The controller unit is further connected to the first display screen, and the controller unit is configured to control the first display screen to be turned on when the measured distance is less than or equal to a preset distance.

In some embodiments of the present disclosure, the glasses further include a second display screen. The second display screen is connected to the controller unit, and the controller unit is configured to control the second display screen to be turned on when the measured distance is less than or equal to the preset distance.

In some embodiments of the present disclosure, the second display screen is disposed on the second temple arm.

In some embodiments of the present disclosure, the first display screen is located in the middle of the first temple arm; the second display screen is located in the middle of the second temple arm.

In some embodiments of the present disclosure, the first temple arm and the second temple arm are both made by flexible materials.

In some embodiments of the present disclosure, the first display screen and the second display screen are both flexible display screens.

In some embodiments of the present disclosure, the first display screen that is in an on state is used to display current time, and/or, display current weather information.

In some embodiments of the present disclosure, the second display screen that is in an on state is used to display current time, and/or, display current weather information.

Some embodiments of the present disclosure provide a method for controlling any of the glasses as described above. The glasses include a controller unit and at least one distance sensor. The method includes: measuring, by the distance sensor, a distance from the first temple arm to the second temple arm, and transmitting the measured distance to the controller unit; controlling, by the controller unit, the first display screen to be turned on when the measured distance is less than or equal to a preset distance.

In some embodiments of the present disclosure, the glasses further include a second display screen. After the distance sensor measures the distance from the first temple arm to the second temple arm and transmits the measured distance to the controller unit, the method further includes: controlling, by the controller unit, the second display screen to be turned on when the measured distance is less than or equal to the preset distance.

In some embodiments of the present disclosure, after the first display screen is turned on, the method further includes: the first display screen displaying current time, and/or, displaying current weather information.

In some embodiments of the present disclosure, after the second display screen is turned on, the method further includes: the second display screen displaying current time, and/or, displaying current weather information.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art may obtain other drawings according to those drawings without paying any creative effort.

FIG. 9 is a seventh schematic structural diagram of a pair of glasses according to some embodiments of the present disclosure;

FIG. 10 is a flow chart of a method for controlling a pair of glasses according to some embodiments of the present disclosure.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

The glasses that users usually wear need to be placed in glasses cases when they are not in use. For example, users wear sunglasses in the glare of the sun outside the house. However, when the light becomes weak, e.g. when the users walk from an outdoor environment to an indoor environment, the users may feel the light is too dark to see things when wearing sunglasses. Under this circumstance, there is no need to wear glasses. At this time, however, if the user does not carry a glasses case with him, he may encounter the problem of having nowhere to put his glasses. That is, glasses are not convenient to carry.

In order to solve the above problem, some embodiments of the present disclosure provide a pair of glasses, such as myopia glasses, plain glass spectacles, sunglasses and the like, which may not be limited in the present disclosure.

Figure 1A:
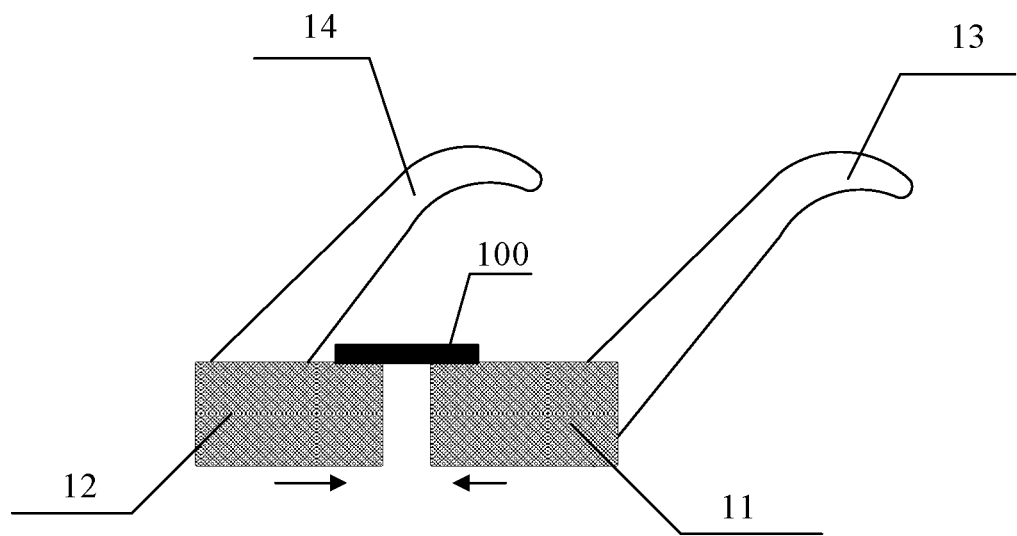
FIG. 1a is a first schematic structural diagram of a pair of glasses according to some embodiments of the present disclosure.

As shown in FIG. 1a, the above glasses include a first lens 11, a second lens 12, a first temple arm 13 that is disposed close to the first lens 11, and a second temple arm 14 that is disposed close to the second lens 12. When the above glasses are sunglasses, both the first lens 11 and the second lens 12 are lenses that have light-shielding function.

As shown in FIG. 1a, the first temple arm 13 may be directly mounted on the first lens 11, and the second temple arm 14 may be directly mounted on the second lens 12.

Figure 1B:
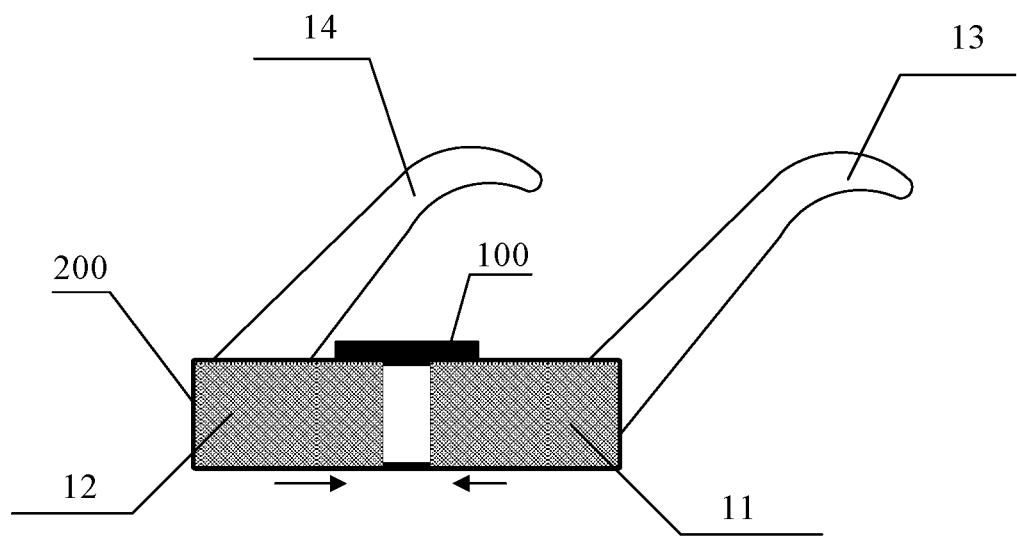
FIG. 1b is a second schematic structural diagram of a pair of glasses according to some embodiments of the present disclosure.

Alternatively, as shown in FIG. 1b, the above glasses further include a frame 200, and the first lens 11 and the second lens 12 are disposed in the frame 200. In this case, the first temple arm 13 and the second temple arm 14 are both mounted on the frame 200.

In addition, the above glasses further include a position adjusting portion 100 that is mounted on the first lens 11 and the second lens 12. The position adjusting portion 100 is configured to adjust an overlapping area of the first lens 11 and the second lens 12. In the case where the above glasses include a frame 200, the position adjusting portion 100 may be a part of the frame 200.

Figure 2:
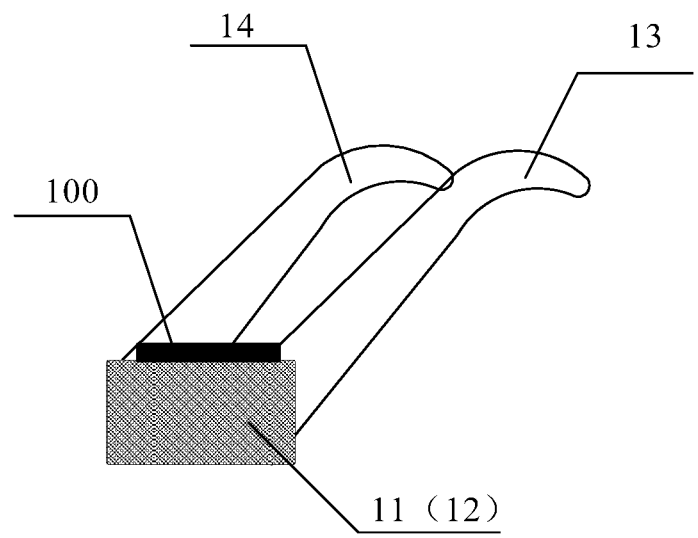
FIG. 2 is a third schematic structural diagram of a pair of glasses according to some embodiments of the present disclosure.

In FIG. 1a, under the action of the position adjusting portion 100, the overlapping area of the first lens 11 and the second lens 12 is zero. Alternatively, under the action of the position adjusting portion 100, the first lens 11 moves to the left along the direction of the arrow shown in FIG. 1a, and the second lens 12 moves to the right along the direction of the arrow shown in FIG. 1a. Finally, as shown in FIG. 2, the first lens 11 moves to a position over the second lens 12 and shields all or almost all of the second lens 12. At this time, the overlapping area of the first lens 11 and the second lens 12 is the largest.

Figure 3:
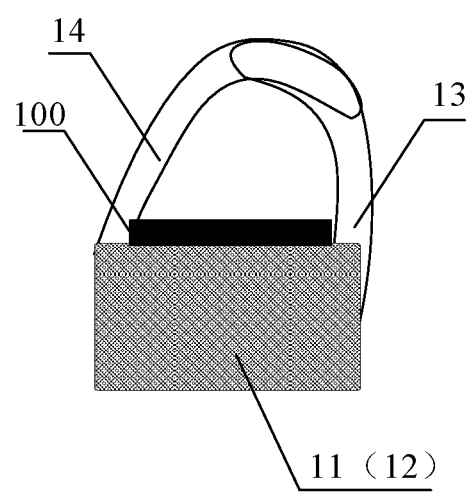
FIG. 3 is a fourth schematic structural diagram of a pair of glasses according to some embodiments of the present disclosure.

The first temple arm 13 and the second temple arm 14 may be bent in extension directions thereof, as shown in FIG. 3, so that the tail end of the first temple arm 13 overlaps the tail end of the second temple arm 14.

Some embodiments of the present disclosure do not limit the materials for manufacturing the first temple arm 13 and the second temple arm 14 either. Generally, materials having strong plasticity are adopted, so that the shape of the first temple arm 13 and the second temple arm 14 can be changed. In some embodiments of the present disclosure, the first temple arm 13 and the second temple arm 14 can be bent in extension directions thereof, so that the tail end of the first temple arm 13 can overlap the tail end of the second temple arm 14. Thus, the glasses are transformed to a wearable watch in shape.

Figure 4:
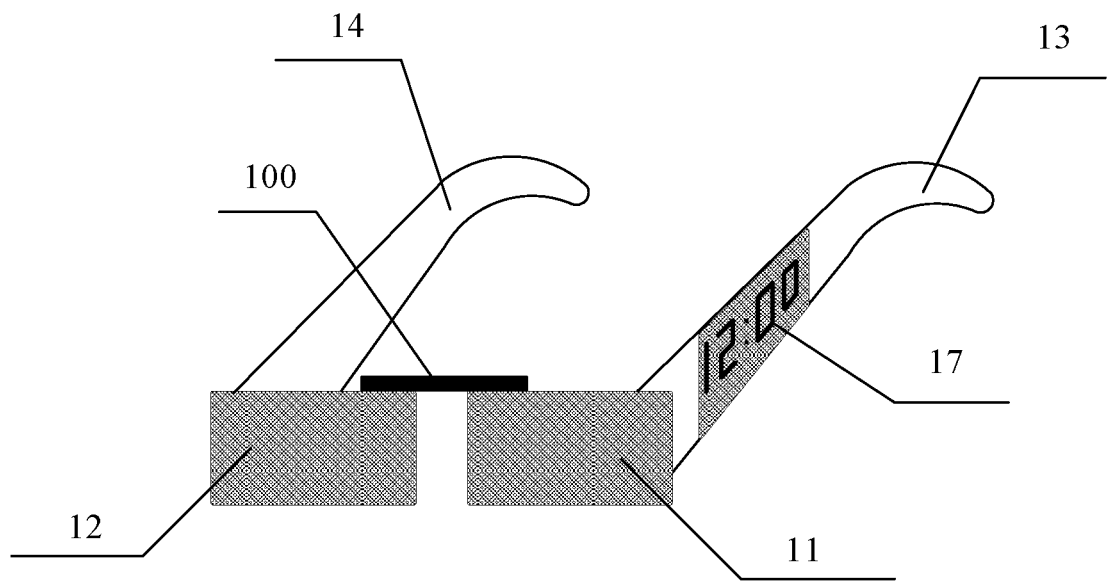
FIG. 4 is a fifth schematic structural diagram of a pair of glasses according to some embodiments of the present disclosure.

In addition, as shown in FIG. 4, the above glasses further include a first display screen 17. In some embodiments of the present disclosure, the first display screen 17 may be disposed on the first temple arm 13, or disposed on the second temple arm 14.

Still alternatively, in some embodiments of the present disclosure, in the case where the first display screen 17 is in a transparent state when being turned off and displays a picture when being turned on, the first display screen 17 may be further disposed on a side of the first lens 11 or the second lens 12 away from the users' eyes. In this case, when the users wear the glasses, the first display screen 17 may be controlled to be in an off state, and at this time, the first display screen 17 does not affect the users' lines of sight; when the users do not wear the glasses, but overlap the tail end of the first temple arm 13 with the tail end of the second temple arm 14, the first display screen 17 may be in an on state to display the picture.

In addition, the size of the first display screen 17 may be set very small so that even if the first display screen 17 is disposed on the side of the first lens 11 or the second lens 12 away from the users' eyes, it will not cause much effect on the users' lines of sight, no matter whether the first display screen 17 is in a transparent state or not.

The first display screen 17 may display a variety of contents in an on state. For example, the first display screen 17 may display the current time, the current date, the current weather, or the countdown as a time measuring instrument, which is not limited in the embodiments of the present disclosure. For convenience of description, the structure of the glasses will be described below by taking the example that the first display screen 17 displays the current time in an on state (that is, the glasses may be transformed into a watch in shape).

In summary, when the glasses provided in some embodiments of the present disclosure are not used, the first lens 11 may be overlapped with the second lens 12 via the position adjusting portion 100, that is, the first lens 11 and the second lens 12 may be folded. In addition, the first temple arm and the second temple arm may be bent. Thereby the size of the glasses after being folded is reduced to facilitate the users to carry.

In addition, the folded first lens 11 and second lens 12 may be placed on the wrist, and then the first temple arm and the second temple arm are bent to make their tail ends overlapped with each other, at last the glasses may be worn on the wrist. At this time, the first display screen 17 is powered on to realize the display function, so as to realize the conversion from the glasses to an electronic product that may be worn on the wrist, thereby releasing the hands and solving the problem that the glasses are not convenient to carry when they are not in use. Thus, functions of the glasses are expanded, and practicality of the glasses is enhanced.

Figure 5:
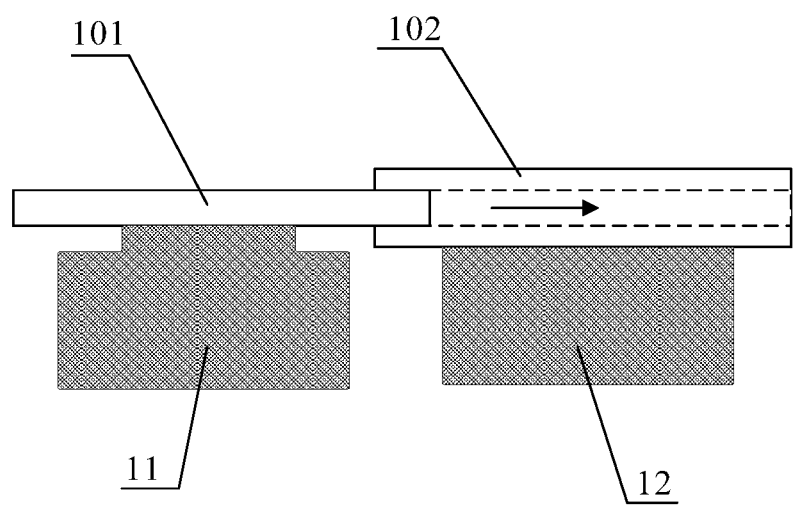
FIG. 5 is a first schematic structural diagram of a position adjusting portion that is connected with a first lens and a second lens according to some embodiments of the present disclosure.

In addition, in some embodiments of the present disclosure, as shown in FIG. 5, the position adjusting portion 100 includes a fixed structure 101 and a sliding structure 102. The fixed structure 101 is mounted on the first lens 11. The sliding structure 102 is mounted on the second lens 12.

At least a part of the fixed structure 101 is located within the sliding structure 102, and the fixed structure 101 is configured to slide along the sliding structure 102 (as indicated by the arrow in FIG. 5), so that the first lens 11 and the second lens 12 at least partially overlap with each other.

The structures of the fixed structure 101 and the sliding structure 102 will be described in detail below.

Figure 6:
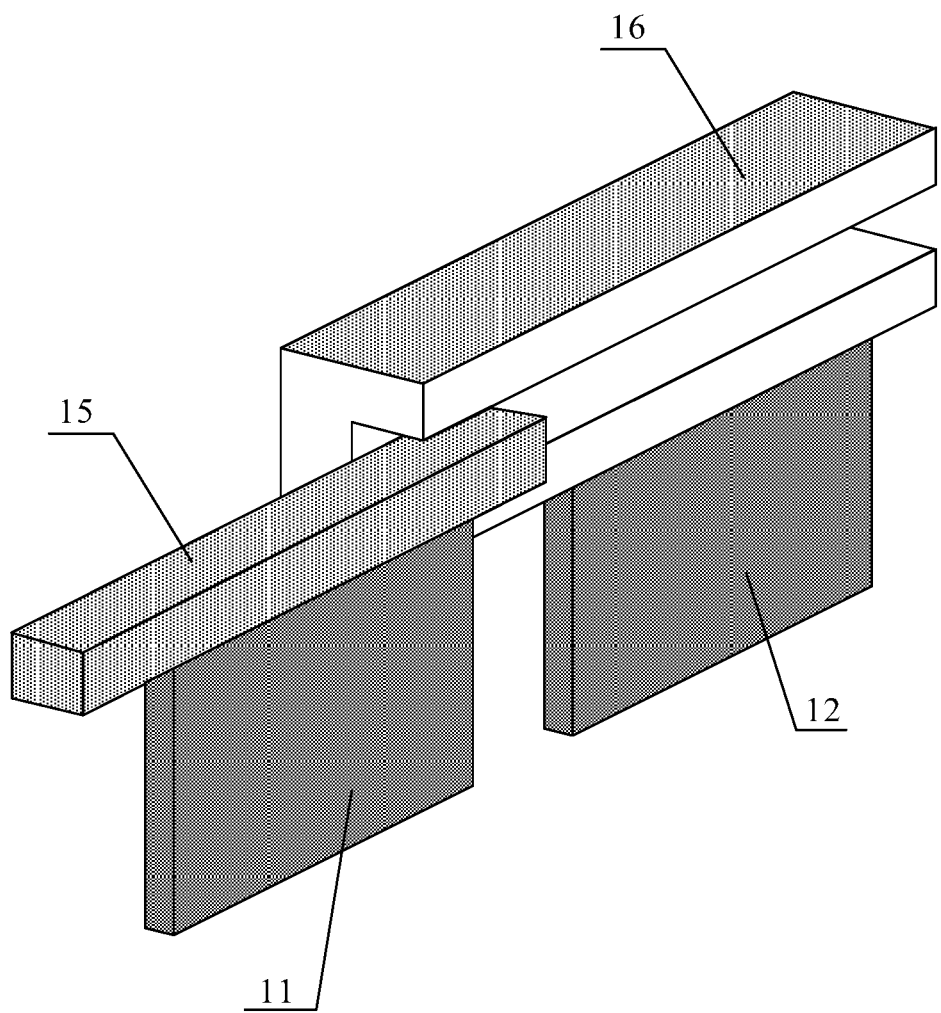
FIG. 6 is a second schematic structural diagram of a position adjusting portion that is connected with a first lens and a second lens according to some embodiments of the present disclosure.

In some embodiments of the present disclosure, the fixed structure 101 may be a fixed bar 15 as shown in FIG. 6, and the fixed bar 15 is mounted on an upper edge and/or a lower edge of the first lens 11. For convenience of explanation, the following description is made by taking the example that the fixed bar 15 is mounted on the upper edge of the first lens 11.

In the embodiments of the present disclosure, it will be noted that the orientation terminologies such as "upper" and "lower" are defined relative to the orientation in which the glasses are schematically placed in the drawings. It will be understood that these orientation terminologies are relative concepts that are used for relative description and clarification, which may vary accordingly depending on the orientation in which the glasses are placed.

In addition, the sliding structure 102 may be a sliding rail 16 as shown in FIG. 6, and the sliding rail 16 is mounted on an outer side of an upper edge and/or a lower edge of the second lens 12 along an extension direction of the fixed bar 15. Alternatively, the sliding rail 16 is mounted on an inner side of an upper edge and/or a lower edge of the second lens 12 along an extension direction of the fixed bar 15.

It will be noted that the above-described "inner side" refers to the side of the second lens 12 that is close to the users' eyes, and the "outer side" refers to the side of the second lens 12 that is away from the users' eyes. When the sliding rail 16 is mounted on the inner side of the upper edge of the second lens 12, the first lens 11 is located on the side that is close to the users' eyes after the first lens 11 and the second lens 12 overlap with each other. When the sliding rail 16 is mounted on the outer side of the upper edge of the second lens 12, the first lens 11 is located on the side that is away from the users' eyes after the first lens 11 and the second lens 12 overlap with each other.

In addition, one end of the fixed bar 15 that is close to the second lens 12 is located in the sliding rail 16, and the fixed bar 15 is configured to slide along the sliding rail 16, so that the first lens 11 and the second lens 12 overlap with each other. In order to enable the fixed bar 15 to slide along the sliding rail 16, the sliding rail 16 that mates with the fixed bar 15 is mounted on the upper edge of the second lens 12 when the fixed bar 15 is mounted on the upper edge of the first lens 11; or, the sliding rail 16 that mates with the fixed bar 15 is mounted on the lower edge of the second lens 12 when the fixed bar 15 is mounted on the lower edge of the first lens 11; or, sliding rails 16 that mate with corresponding fixed bars 15 are mounted on both the upper edge and the lower edge of the second lens 12 when fixed bars 15 are mounted on both the upper edge and the lower edge of the first lens 11. For convenience of explanation, the following description is made by taking the example that the fixed bar 15 is mounted on the upper edge of the first lens 11 and the sliding rail 16 is mounted on the upper edge of the second lens 12.

It can be seen from the above description that in FIG. 6, one end of the fixed bar 15 that is close to the second lens 12 is located in the sliding rail 16, and the fixed bar 15 may slide along the sliding rail 16. Since the fixed bar 15 is fixed to the first lens 11, the fixed bar 15 drives the first lens 11 to move toward the second lens 12 when the fixed bar 15 slides along the sliding rail 16, so that the first lens 11 eventually overlaps the second lens 12. This reduces the size of the glasses, and thereby transforms the glasses into a watch that is convenient for the users to wear.

Figure 7:
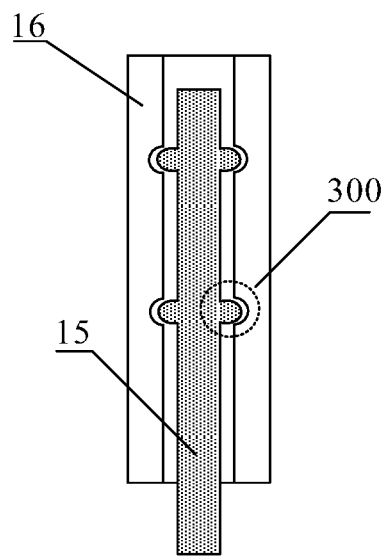
FIG. 7 is a schematic structural diagram of a locking structure that is disposed between a fixed bar and a sliding rail in the position adjusting portion of FIG. 6.

On this basis, in order to fix the relative positions of the first lens 11 and the second lens 12 in the process when the first lens 11 follows the fixed bar 15 to slide along the sliding rail 16, a locking structure 300 as shown in FIG. 7 is disposed between the fixed bar 15 and the sliding rail 16. The locking structure 300 is configured to define the relative positions of the fixed bar 15 and the sliding rail 16, so that the users may lock the relative positions of the first lens 11 and the second lens 12 depending on the needs, thus preventing the relative positions of the first lens 11 and the second lens 12 from changing after the first lens 11 and the second lens 12 are overlapped with each other.

In some embodiments of the present disclosure, the locking structure 300 may include a groove and a protrusion that mate with each other. The groove and the protrusion may be respectively disposed on the sliding rail 16 and the fixed bar 15, or may be respectively disposed on the fixed bar 15 and the sliding rail 16. The protrusion may have elasticity. Therefore, when the users want to change the relative positions of the first lens 11 and the second lens 12, a large force may be used to push the protrusion out of the groove, thus making the relative positions of the first lens 11 and the second lens 12 in an unlocked state.

It can be seen from the above description that, when the users do not use the glasses, the first lens 11 may be overlapped with the second lens 12, and the first temple arm 13 and the second temple arm 14 may be bent to convert the glasses into a watch that may be worn on the wrist. In this case, the first display screen 17 on the glasses can be turned on and display information. Based on this, the first display screen 17 may be turned on in various ways. Exemplarily, the first display screen 17 may be turned on by setting a controller unit and a preset start condition. When the preset start condition is met, the controller unit automatically controls the first display screen 17 to be turned on. Alternatively, the users may arrange a start switch and control the first display screen 17 to be turned on by manually pressing the start switch. The embodiments of the present disclosure do not limit the ways for turning on the first display screen 17.

Figure 8:
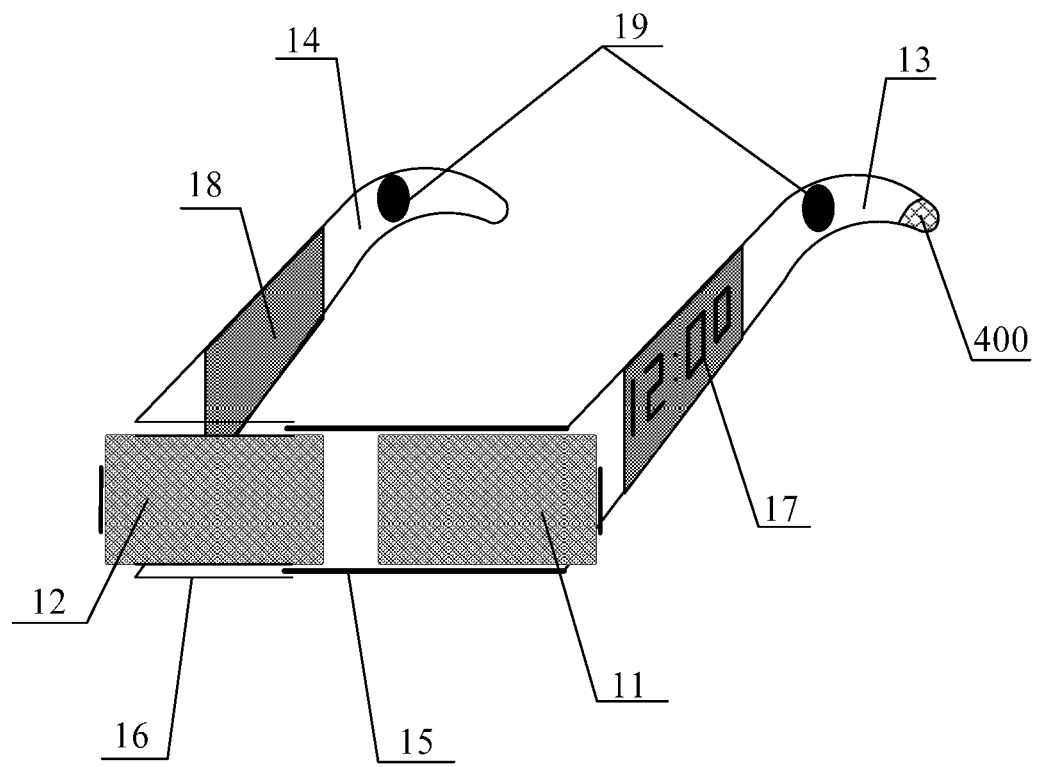
FIG. 8 is a sixth schematic structural diagram of a pair of glasses according to some embodiments of the present disclosure.

In the case where the glasses further include a controller unit 400 and at least one distance sensor 19 as shown in FIG. 8, the following description is made for a solution in which the controller unit 400 and the distance sensor 19 mate with each other to control the first display screen 17 to be turned on.

As shown in FIG. 8, the controller unit 400 is disposed on the first temple arm 13. Alternatively, the controller unit 400 may be disposed on the second temple arm 14 or on the frame 200.

In addition, the distance sensor 19 is disposed on the tail end of the first temple arm 13 and/or the tail end of the second temple arm 14. FIG. 8 is a description by taking the example that both the first lens 13 and the second temple arm 14 are provided with the above-described distance sensor 19.

The distance sensor 19 is configured to measure the distance from the first temple arm 13 to the second temple arm 14, and transmits the measured distance to the controller unit.

The controller unit 400 is configured to control the first display screen 17 to be turned on when the measured distance is less than or equal to the preset distance.

The preset distance is a preset distance from the first temple arm 13 to the second temple arm 14. For example, when the users connect the tail end of the first temple arm 13 with the tail end of the second temple arm 14, the distance from the first temple arm 13 to the second temple arm 14 is close to zero, so the preset distance can be set to zero. Alternatively, when the tail ends of the first temple arm 13 and the second temple arm 14 are provided with buckles, the tail end of the first temple arm 13 can be connected with the tail end of the second temple arm 14 by fastening the buckles. In this case, the preset distance is equivalent to the thickness of the buckles after being fastened. The present disclosure does not elaborate other setting manners of the preset distance here, and those skilled in the art may set them according to actual conditions.

Some embodiments of the present disclosure do not limit the type of the distance sensor 19. In practice, in order to obtain high measurement accuracy, the distance sensor 19 is generally a structural-type sensor. Exemplarily, the distance sensor 19 may be any one of a strain resistance type distance sensor, an inductive distance sensor, a capacitive distance sensor, and a magnetoelectric distance sensor.

It can be seen from the above description that the distance sensor 19 sends a signal to the controller unit 400 after measuring the distance from the first temple arm 13 to the second temple arm 14. The controller unit 400 receives the signal transmitted from the distance sensor 19 and processes it. When the measured distance received by the controller unit 400 is greater than the preset distance, the controller unit 400 does not control the first display screen 17 to be turned on. At this time, the first display screen 17 is in a non-working state, and the users can wear glasses, e.g. sunglasses to shield the light.

In addition, when the users do not need to wear the glasses, as shown in FIG. 9, the users may overlap the first lens 11 with the second lens 12 and bend the first temple arm 13 and the second temple arm 14, so that the glasses can be converted into a watch that may be worn on the wrist. In this case, when the measured distance received by the controller unit 400 is less than or equal to the preset distance, the controller unit 400 controls the first display screen 17 to be turned on. At this time, the first display screen 17 is in a working state, and the glasses function as a watch. This enables automatic start of the first display screen 17 and improves the intelligence degree.

In some embodiments of the present disclosure, as shown in FIG. 8, the glasses further include a second display screen 18.

The second display screen 18 is connected to the controller unit 400. The controller unit 400 is further configured to control the second display screen 18 to be turned on when the measured distance is less than or equal to the preset distance. This manner may improve the degree of intelligence.

In some embodiments of the present disclosure, the second display screen 18 is disposed on the second temple arm 14.

The second display screen 18 is configured to display the current date in its "on state". The functional diversity of the glasses may be improved by increasing the function to display date. Further, the first display screen 17 or the second display screen 18 is also used to display the current weather information in its "on state". In this way, the functional diversity of the glasses may be further improved to meet the needs of users.

In practice, the second display screen 18 can be automatically controlled to be turned on by the controller unit 400; or the users may arrange a start switch and control the second display screen 18 to be turned on by manually pressing the start switch, which, however, is not limited in the embodiments of the present disclosure.

When the glasses are converted into a wearable watch, the first display screen 17 is generally located in the middle of the first temple arm 13, and the second display screen 18 is generally located in the middle of the second temple arm 14, in order to facilitate viewing of the first display screen 17 and the second display screen 18. In this case, the positions of the first display screen 17 and the second display screen 18 correspond to each other when the first temple arm 13 and the second temple arm 14 are placed in parallel.

In some embodiments of the present disclosure, in order that the first temple arm 13 and the second temple arm 14 can be bent in the extension directions thereof, so that the tail end of the first temple arm 13 overlaps the tail end of the second temple arm 14, both the first temple arm 13 and the second temple arm 14 are made of flexible materials. Based on this, both the first display screen 17 disposed on the first temple arm 13 and the second display screen 18 disposed on the second temple arm 14 are flexible display screens.

In summary, the glasses provided in some embodiments of the present disclosure include a first lens 11 and a second lens 12, a first temple 13 and a second temple 14, and also include a position adjusting portion 100 that can adjust an overlapping area of the first lens 11 and the second lens 12. In addition, the glasses further include a display screen 17. The display screen 17 displays the current time in its on state. The first temple arm 13 and the second temple arm 14 may be bent in the extension directions thereof, so that the tail end of the first temple arm 13 overlaps the tail end of the second temple arm 14. In this way, when the glasses provided in some embodiments of the present disclosure are not used, the users can overlap the first lens 11 with the second lens 12 via the position adjusting portion 100, that is, the first lens 11 and the second lens 12 are folded. The folded first lens 11 and second lens 12 may be placed on the wrist, and then the first temple arm 13 and the second temple arm 14 are bent to make their tail ends overlapped with each other, therefore the glasses can be worn on the wrist. At this time, the first display screen 17 is powered on to realize the display function, so as to realize the conversion from the glasses to an electronic product that may be worn on the wrist, thereby releasing the hands and solving the problem that the glasses are not convenient to carry when they are not in use. Thus, functions of the glasses are expanded, and practicality of the glasses is enhanced.

Some embodiments of the present disclosure also provide a method for controlling the glasses as described above. In the case where the glasses include a controller unit 400 and at least one distance sensor 19 as shown in FIG. 10, the method includes S101 and S102.

S101: The distance sensor 19 measures the distance from the first temple arm 13 to the second temple arm 14, and transmits the measured distance to the controller unit 400.

S102: The controller unit 400 controls the first display screen 17 to be turned on when the measured distance is less than or equal to the preset distance.

The method for controlling the glasses has the same technical effects as the glasses provided in the foregoing embodiments, which will not be elaborated here.

In addition, in the case where the glasses further include a second display screen 18, after S101, the method further includes: controlling, by the controller unit 400, the second display screen 18 to be turned on when the measured distance is less than or equal to the preset distance.

In addition, after the first display screen 17 is turned on, the method further includes: the first display screen 17 displaying the current time, and/or, displaying the current weather information.

After the second display screen 18 is turned on, the method further includes: the second display screen 18 displaying the current time, and/or, displaying the current weather information.

The above embodiments are merely specific embodiments of the present disclosure, but the protection scope of the present disclosure is not limited thereto. Any person skilled in the art could readily conceive of changes or replacement within the technical scope of the present disclosure, which shall all be included in the protection scope of the present disclosure. Therefore, the protection scope of the present disclosure shall be determined by the protection scope of the claims.

What is claimed is:

1. A pair of glasses, comprising a first lens, a second lens, a first temple arm that is disposed close to the first lens, and a second temple arm that is disposed close to the second lens; wherein, the glasses further comprise a position adjusting portion that is mounted on the first lens and the second lens; the position adjusting portion is configured to adjust an overlapping area of the first lens and the second lens;

the glasses further comprise a first display screen;

the first temple arm and the second temple arm are bendable in extension directions thereof, so that a tail end of the first temple arm overlaps a tail end of the second temple arm;

the glasses further comprise a controller unit and at least one distance sensor;

the controller unit is disposed on the first temple arm;

the distance sensor is disposed on a tail end of the first temple arm and/or a tail end of the second temple arm;

the distance sensor is configured to measure a distance from the first temple arm to the second temple arm, and transmit the measured distance to the controller unit; the controller unit is further connected to the first display screen, and the controller unit is configured to control the first display screen to be turned on when the measured distance is less than or equal to a preset distance;

the glasses further comprise a second display screen;

the second display screen is connected to the controller unit, and the controller unit is configured to control the second display screen to be turned on when the measured distance is less than or equal to the preset distance; and the pair of glasses is a pair of sunglasses.

2. The glasses according to claim 1, wherein the position adjusting portion comprises a fixed structure and a sliding structure;

the fixed structure is mounted on the first lens; the sliding structure is mounted on the second lens; at least a part of the fixed structure is located in the sliding structure, and the fixed structure is configured to slide along the sliding structure, so that the first lens at least partially overlaps the second lens.

3. The glasses according to claim 2, wherein the glasses further comprise a frame; the first lens and the second lens are disposed in the frame; the first temple arm and the second temple arm are both mounted on the frame;

the frame comprises the position adjusting portion.

4. The glasses according to claim 3, wherein the first display screen is disposed on the first temple arm.

5. The glasses according to claim 1, wherein the fixed structure is a fixed bar, and the fixed bar is mounted on an upper edge and/or a lower edge of the first lens;

the sliding structure is a sliding rail, and the sliding rail is mounted on an outer side or an inner side of an upper edge and/or a lower edge of the second lens along an extension direction of the fixed bar;

one end of the fixed bar that is close to the second lens is located in the sliding rail, and the fixed bar is configured to slide along the sliding rail, so that the first lens and the second lens overlap.

6. The glasses according to claim 5, wherein a locking structure is disposed between the fixed bar and the sliding rail; the locking structure is configured to define relative positions of the fixed bar and the sliding rail.

7. The glasses according to claim 1, wherein the second display screen is disposed on the second temple arm.

8. The glasses according to claim 7, wherein the first display screen is located in the middle of the first temple arm; the second display screen is located in the middle of the second temple arm.

9. The glasses according to claim 1, wherein the first temple arm and the second temple arm are both made by flexible materials.

10. The glasses according to claim 1, wherein the first display screen and the second display screen are both flexible display screens.

11. The glasses according to claim 1, wherein the first display screen that is in an on state is used to display current time, and/or, display current weather information.

12. The glasses according to claim 1, wherein, the second display screen that is in an on state is used to display current time, and/or, display current weather information.

13. A method for controlling the glasses according to claim 1, wherein the method comprises:
    measuring, by the distance sensor, a distance from the first temple arm to the second temple arm, and transmitting the measured distance to the controller unit;
    controlling, by the controller unit, the first display screen to be turned on when the measured distance is less than or equal to a preset distance;
    controlling, by the controller unit, the second display screen to be turned on when the measured distance is less than or equal to the preset distance.

14. The method for controlling the glasses according to claim 13, wherein after the first display screen is turned on, the method further comprises:
    the first display screen displaying current time, and/or, displaying current weather information.

15. The method for controlling the glasses according to claim 13, wherein after the second display screen is turned on, the method further comprises:
    the second display screen displaying current time, and/or, displaying current weather information.

* * * * *